United States Patent
Ljung (10) Patent No.: US 11,834,114 B2
(45) Date of Patent: Dec. 5, 2023

(54) DEFLECTOR ARRANGEMENT FOR A TRACKED VEHICLE

(71) Applicant: BAE Systems Hägglunds Aktiebolag, Örnsköldsvik (SE)

(72) Inventor: Jonny Ljung, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 381 days.

(21) Appl. No.: 17/258,687

(22) PCT Filed: Jul. 2, 2019

(86) PCT No.: PCT/SE2019/050658
§ 371 (c)(1),
(2) Date: Jan. 7, 2021

(87) PCT Pub. No.: WO2020/013751
PCT Pub. Date: Jan. 16, 2020

(65) Prior Publication Data
US 2021/0269107 A1  Sep. 2, 2021

(30) Foreign Application Priority Data
Jul. 9, 2018 (SE) .................................. 1850862-2

(51) Int. Cl.
*B62D 55/088* (2006.01)
*B62D 55/06* (2006.01)
*B62D 55/104* (2006.01)

(52) U.S. Cl.
CPC ........... *B62D 55/088* (2013.01); *B62D 55/06* (2013.01); *B62D 55/104* (2013.01)

(58) Field of Classification Search
CPC .. B62D 55/0882; B62D 55/088; B62D 55/08; B62D 55/06; B62D 55/104; B62D 55/0847; B62D 55/108
See application file for complete search history.

(56) References Cited

U.S. PATENT DOCUMENTS 2,571,285 A * 10/1951 Oehler .................. A01C 5/068
280/856
2,982,584 A * 5/1961 Uemura ................. B62D 55/20
305/110

(Continued)

FOREIGN PATENT DOCUMENTS

EP    3208181 A1    8/2017
GB    2357066 A     6/2001

(Continued)

OTHER PUBLICATIONS

Extended European Search Report received for European Patent Application No. 19833632.3 dated Feb. 2, 2022, 7 pages.

*Primary Examiner* — Jacob D Knutson
*Assistant Examiner* — Abigail R Hymel
(74) *Attorney, Agent, or Firm* — MORRISON & FOERSTER LLP (57) ABSTRACT

The invention relates to a deflector arrangement (100) for a tracked vehicle (V). Said tracked vehicle (V) comprises at least one track assembly (T1, T2) comprising two end wheels (1, 2) in the form of a front wheel (1) and a rear wheel (2), and further a plurality of road wheels (3) there between. At least one of the front wheel (1) and rear wheel (2) is a drive wheel (1) and at least one of the front wheel (1) and rear wheel (2) is a tension wheel (2). The track assembly (T1, T2) further comprises an endless track (4) disposed around said end wheels (1, 2) and plurality of road wheels (3). Said deflector arrangement (100) is configured to reduce ingestion of undesired material from the ground (G) into said track assembly (T1, T2) and remove such undesired material from said track assembly (T1, T2). Said deflector arrangement (100) is associated with an end wheel (1, 2) and is resiliently suspended and biasedly arranged so as to strive towards the inner surface (4a) of the endless track (4).

11 Claims, 4 Drawing Sheets

(56) References Cited

U.S. PATENT DOCUMENTS

| | | | |
|---|---|---|---|
| 5,226,703 A * | 7/1993 | Norman | B62D 55/0882 |
| | | | 305/110 |
| 5,697,683 A | 12/1997 | Arulandu et al. | |
| 2002/0195875 A1* | 12/2002 | Brawley | B62D 55/0882 |
| | | | 305/107 |
| 2005/0046277 A1 | 3/2005 | Simons et al. | |
| 2005/0127751 A1 | 6/2005 | Bedard | |
| 2005/0269877 A1* | 12/2005 | Breton | B60S 1/68 |
| | | | 305/107 |
| 2008/0150355 A1* | 6/2008 | Breton | B62D 55/088 |
| | | | 305/107 |
| 2009/0200859 A1* | 8/2009 | Matthys | B62D 55/088 |
| | | | 180/9.1 |
| 2012/0146400 A1* | 6/2012 | Nebergall | B62D 55/0882 |
| | | | 305/109 |
| 2017/0000014 A1 | 1/2017 | Anderson et al. | |

FOREIGN PATENT DOCUMENTS

| | | |
|---|---|---|
| SU | 1751035 A1 | 7/1992 |
| WO | WO-2015046533 A1 | 4/2015 |

\* cited by examiner

DEFLECTOR ARRANGEMENT FOR A TRACKED VEHICLE

CROSS REFERENCE TO RELATED APPLICATIONS

This application is a national stage application under 35 U.S.C. § 371 of International Application No. PCT/SE2019/050658, filed internationally on Jul. 2, 2019, which claims priority to SE 1850862-2, filed Jul. 9, 2018, the disclosures of which are herein incorporated by reference in their entirety.

TECHNICAL FIELD

The present invention relates to a deflector arrangement for a tracked vehicle. The present invention relates to a tracked vehicle.

BACKGROUND

Tracked vehicles normally comprise a pair of track assemblies, where each track assembly of the pair of track assemblies comprises a front drive wheel, a rear tension wheel and a plurality of road wheels there between. The respective track assembly further comprises an endless track running over the drive wheel, the plurality of support wheels and the tensions wheel. Said drive wheel and said plurality of support wheels are rotatably secured to the vehicle body of the vehicle.

Such tracked vehicles, e.g. combat vehicles, are intended to be driven in rough terrain. A problem during drive in rough terrain with such vehicle is that ingestion of undesired material such as gravel and stones into the respective track assembly and in between wheels and the endless track may occur which in turn cause damages to the tracked vehicle and in some cases may result in the endless track being torn apart.

U.S. Pat. No. 2,637,603A discloses a muck stripper for endless track treads for use in connection with drive sprockets, the stripper being arranged to prevent foreign material from being carried around the sprocket during operation of the endless track tread.

US2008150355A1 discloses a deflector for reducing the ingestion of snow and/or other debris in one of the sprocket wheel and idler wheel area of a vehicle equipped with endless tracks.

There is however a need to present improvements in deflector arrangements for tracked vehicles.

OBJECT OF THE INVENTION

An object of the present invention is to provide a deflector arrangement for a tracked vehicle, which efficiently reduces ingestion of undesired material from the ground into said track assembly and facilitates removal of such undesired material from said track assembly.

A further object of the present invention is to provide a tracked vehicle comprising such a deflector arrangement.

SUMMARY OF INVENTION

These and other objects, which will become apparent from the following description, are achieved by a deflector arrangement for a tracked vehicle and a tracked vehicle as set out in the appended independent claim. Preferred embodiments of the deflector arrangement are defined in the appended dependent claims.

Specifically an object of the invention is achieved by a deflector arrangement for a tracked vehicle. Said tracked vehicle comprises at least one track assembly comprising two end wheels in the form of a front wheel and a rear wheel, and further a plurality of road wheels there between. At least one of the front wheel and rear wheel is a drive wheel and at least one of the front wheel and rear wheel is a tension wheel. The track assembly further comprises an endless track, said endless track being disposed around said end wheels and plurality of road wheels. Said deflector arrangement is configured to reduce ingestion of undesired material from the ground into said track assembly and removal of such undesired material from said track assembly. Said deflector arrangement is associated with an end wheel and is resiliently suspended and biasedly arranged so as to strive towards the inner surface of the endless track.

By thus providing a deflector arrangement being associated with an end wheel and being resiliently suspended and biasedly arranged so as to strive towards the inner surface of the endless track, ingestion of undesired material from the ground such as gravel and stones into said track assembly is efficiently reduced. Further, removal of such undesired material from said track assembly is facilitated. This is due to the deflector arrangement being thus resiliently suspended and biased, resulting in the deflector arrangement smoothly adapting to the vehicle movements and at the same striving towards the inner surface of the endless track due to the biasing force, i.e. to a great extent is kept towards the inner surface of the endless track, and thereby essentially preventing such undesired material to be introduced into the track assembly in connection to the deflector arrangement and efficiently removing such undesired material that has been ingested into the track assembly when approaching the deflector arrangement so that no such material is allowed to travel around the end wheel between the end wheel and endless track. Thus, herby the risk of the endless track being torn apart due to undesired material from the ground being ingested into the track assembly may be efficiently avoided. Hereby an endless track of rubber material may advantageously be used. The risk of the deflector arrangement being damaged is, due to the deflector arrangement being resiliently suspended, reduced. The deflector arrangement may, due to the deflector arrangement being resiliently suspended, handle any movements of the endless track. The deflector arrangement may, due to the deflector arrangement being resiliently suspended, withstand high loads during vehicle operation. The deflector arrangement may, due to the deflector arrangement being resiliently suspended, withstand being tilted due to side forces in connection to the deflector arrangement.

Said deflector arrangement may according to an embodiment be suspended with respect to an end wheel or a road wheel adjacent to that end wheel. Said deflector arrangement may be thus resiliently suspended and biasedly arranged so as to strive towards the inner surface of the endless track by means of a force.

According to an embodiment of the deflector arrangement said deflector arrangement is coaxially suspended with respect to the axis of an end wheel or a road wheel adjacent to that end wheel. Hereby the deflector arrangement may be efficiently and easily resiliently suspended and biased.

According to an embodiment of the deflector arrangement said deflector arrangement comprises a plough arrangement being arranged between said end wheel and adjacent road wheel and configured to prevent such undesired material to be carried by said endless track around said end wheel. Hereby prevention of such undesired material to be introduced into the track assembly in connection to the deflector arrangement is efficiently achieved and efficient removal of such undesired material is facilitated for the prevention of such undesired material to be carried by said endless track around said end wheel.

According to an embodiment of the deflector arrangement said deflector arrangement comprises a support wheel arrangement configured to roll against the inner surface of said endless track during movement of said vehicle. Hereby operation of the deflector arrangement is further improved in that the deflector arrangement due to the support wheel arrangement is allowed to roll freely relative to the endless track when the deflector arrangement strives towards the inner surface of the endless track. The risk of the deflector arrangement being damaged is, due to the thus provided support wheel arrangement, reduced.

According to an embodiment of the deflector arrangement said support wheel arrangement is arranged in connection to the plough arrangement. Hereby operation of the deflector arrangement is further improved in that the deflector arrangement due to the support wheel arrangement arranged in connection to the plough arrangement is allowed to roll freely relative to the endless track when the deflector arrangement strives towards the inner surface of the endless track. The risk of the deflector arrangement being damaged is, due to the thus provided support wheel arrangement, reduced.

According to an embodiment of the deflector arrangement said plough arrangement comprises a first plough member configured to be arranged on the outer side of the track assembly and a second plough member configured to be arranged on the inner side of the track assembly. Hereby prevention of such undesired material to be introduced into the track assembly in connection to the deflector arrangement is efficiently achieved and efficient removal such undesired material is facilitated for the prevention of such undesired material to be carried by said endless track around said end wheel.

According to an embodiment of the deflector arrangement said deflector arrangement comprises first and second laterally disposed shield elements configured to protect the wheel to which it is coaxially suspended on the respective side of the wheel. Hereby efficient protection of the wheel to which the deflector arrangement is coaxially suspended is facilitated.

According to an embodiment of the deflector arrangement said deflector arrangement is coaxially suspended to the hub of said axis, wherein each plough member is attached to said hub via said laterally disposed shield element.

According to an embodiment of the deflector arrangement, the deflector arrangement is resiliently suspended and biasedly arranged by means of a spring arrangement.

According to an embodiment of the deflector arrangement, the spring arrangement comprises bushings and/or a torsion spring arrangement arranged in connection to said hub of said axis. Hereby efficient resilience of the resiliently suspended deflector arrangement is obtained. Hereby efficient biasing of the biasedly arranged deflector arrangement is facilitated. The bushings may according to an embodiment be rubber bushings. Such bushings further facilitates for the deflector arrangement to withstand being tilted due to side forces in connection to the deflector arrangement.

Specifically an object of the invention is achieved by a tracked vehicle comprising at least one deflector arrangement as set out herein.

According to an embodiment of the tracked vehicle, said tracked vehicle comprises a left track assembly, a right track assembly and a vehicle body, wherein said track assemblies are suspendedly arranged to said vehicle body via said road wheels by means of a suspension system, each track assembly comprising at least one deflector arrangement.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION OF THE INVENTION

The tracked vehicle according to the present disclosure may be any suitable tracked vehicle. The tracked vehicle according to the present disclosure may comprise at least one track assembly comprising two end wheels in the form of a front wheel and a rear wheel, and further a plurality of road wheels there between. For the tracked vehicle according to the present disclosure, at least one of the front wheel and rear wheel may be a drive wheel and at least one of the front wheel and rear wheel may be a tension wheel. For the tracked vehicle according to the present disclosure, the track assembly further comprises an endless track, said endless track being disposed around said end wheels and plurality of road wheels.

Figure 1:
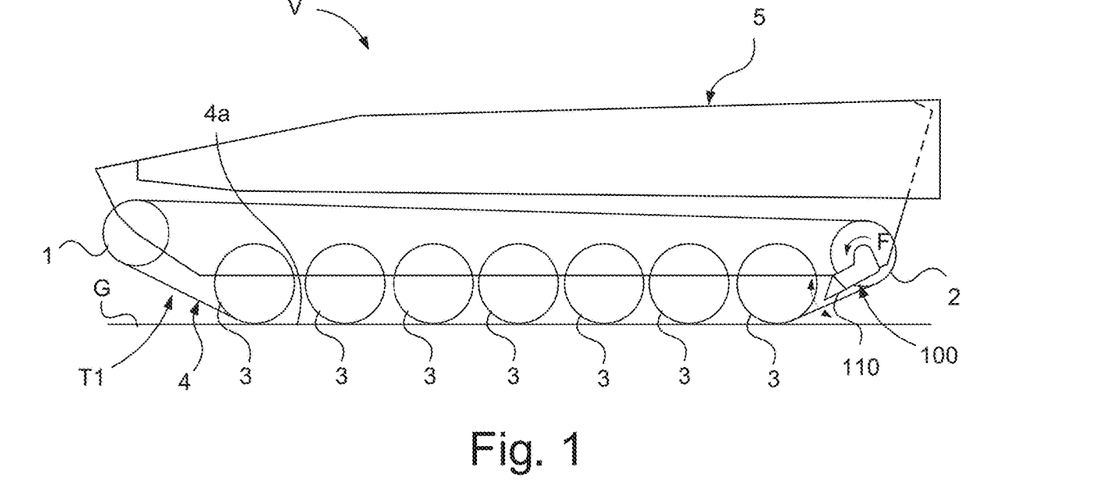
FIG. 1 schematically illustrates a side view of a tracked vehicle according to an embodiment of the invention.

FIG. 1 schematically illustrates a side view of a tracked vehicle V according to an embodiment of the present disclosure. The tracked vehicle V is driving on a ground G. The tracked vehicle V is a motor vehicle. The exemplified tracked vehicle V is constituted by a military tracked vehicle.

The tracked vehicle V comprises a track assembly pair comprising two track assemblies, a left track assembly T1 and a right track assembly, the left track assembly T1 being shown in FIG. 1. The respective track assembly, here illustrated with the left track assembly T1, comprises two end wheels 1, 2 in the form of a front wheel 1 and a rear wheel 2, and further a plurality of road wheels 3 there between. According to the embodiment in FIG. 1, the front wheel 1 is a drive wheel 1 and the rear wheel 2 is a tension wheel 2. The track assembly further comprises an endless track 4, said endless track 4 being disposed around said end wheels 1, 2 and plurality of road wheels 3. The endless track 4 is thus configured to run around the drive wheel 1, tension wheel 2 and plurality of road wheels 3. The endless track 4 is a propulsion track 4 running around said wheels 1, 2, 3 for driving the vehicle V. The endless track 4 has an inner side with an inner surface 4a, which at least partly is in contact with the wheels 1, 2, 3 when the endless track is running around the wheels 1, 2, 3.

The drive wheel 1 is configured to be operated by any suitable drive means such as an internal combustion engine and or/or an electric motor. The drive wheel 1 is configured to be rotated by the drive means for rotating the endless track for driving the vehicle. The respective drive wheel of the vehicle V is configured to be rotated by the drive means.

Further the vehicle 1 comprises a vehicle body 5, which may include the chassis of the vehicle and bodywork.

The vehicle V comprises a suspension system comprising a suspension device for the respective track assembly. The respective track assembly of the vehicle V is thus arranged to be supported by the vehicle body 5 by means of said suspension device. The road wheels 3 of the respective track assembly of the vehicle V is arranged to be supported by the vehicle body 5 by means of said suspension device. Hereby movability and comfort of the vehicle V is improved in that the vehicle body 5 is allowed to be raised and lowered relative to the track assembly. The suspension device is described in more detail with reference to FIG. 5.

The vehicle V comprises a deflector arrangement 100 for the respective track assembly. The deflector arrangement 100 is configured to reduce ingestion of undesired material from the ground G into said track assembly T1 and removal of such undesired material from said track assembly T1.

Said deflector arrangement 100 is associated with the tension wheel 2 and is resiliently suspended and biasedly arranged so as to strive towards the inner surface 4a of the endless track 4.

According to this embodiment the deflector arrangement 100 is coaxially suspended with respect to the axis of the tension wheel 2.

The deflector arrangement comprises a plough arrangement 110 being arranged between said tension wheel 2 and adjacent road wheel 3 and configured to prevent such undesired material to be carried by said endless track around said tension wheel 2.

Said deflector arrangement 100 is suspended with respect to the tension wheel 2 and is resiliently suspended and biasedly arranged so as to strive towards the inner surface 4a of the endless track 4 by means of a force F. Said deflector arrangement 100 is coaxially suspended with respect to the axis of the tension wheel 2 and is resiliently suspended and biasedly arranged so as to strive towards the inner surface 4a of the endless track 4 by means of a force F.

Figure 2:
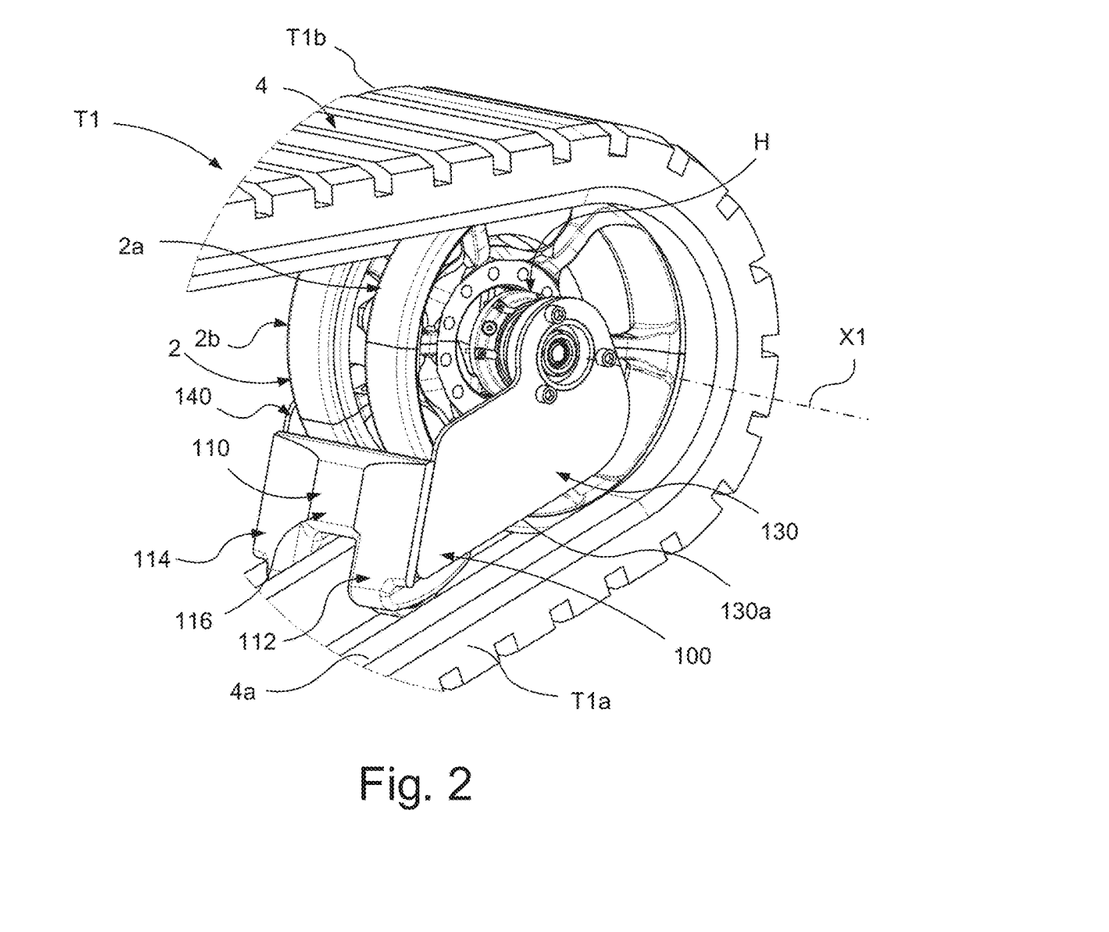
FIG. 2 schematically illustrates a perspective view of a deflector arrangement according to an embodiment of the present disclosure, arranged in connection to a tension wheel of a tracked vehicle.
Figure 3A:
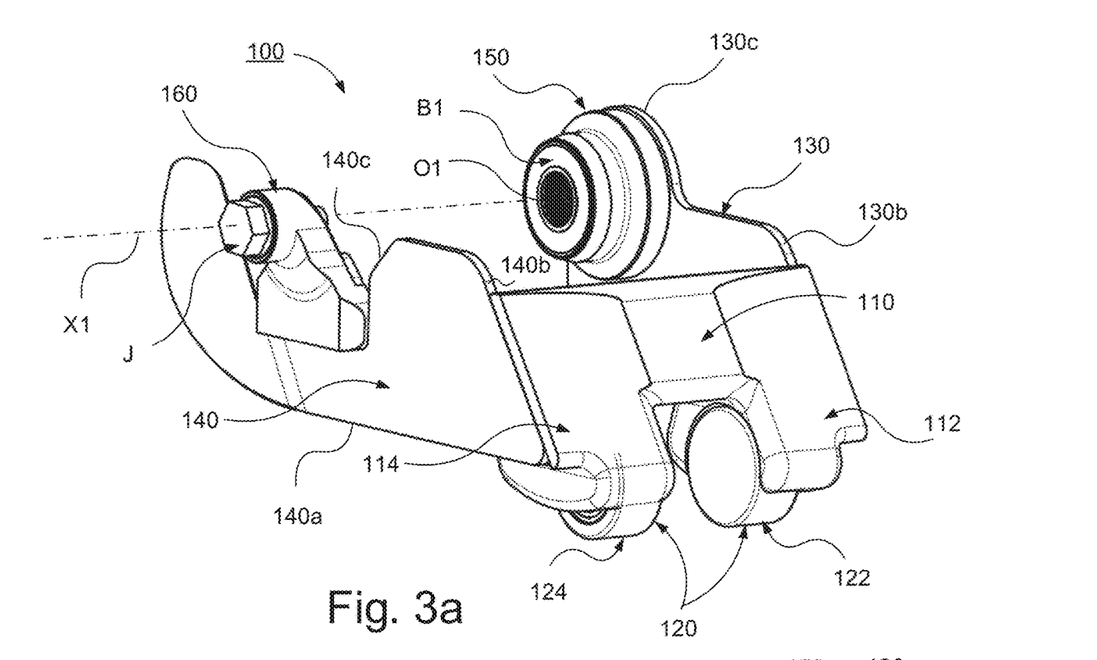
FIG. 3a schematically illustrates a perspective view of the deflector arrangement in FIG. 2.

FIG. 2 schematically illustrates a perspective view of a deflector arrangement 100 according to an embodiment of the present disclosure, arranged in connection to a tension wheel 2 of a tracked vehicle; and FIGS. 3a. and 3b schematically illustrate different perspective views of the deflector arrangement 100 in FIG. 2. FIG. 4 schematically illustrates a cross sectional view of the tension wheel 2 in connection to which the deflector arrangement 100 according to the present disclosure is configured to be arranged.

Figure 5:
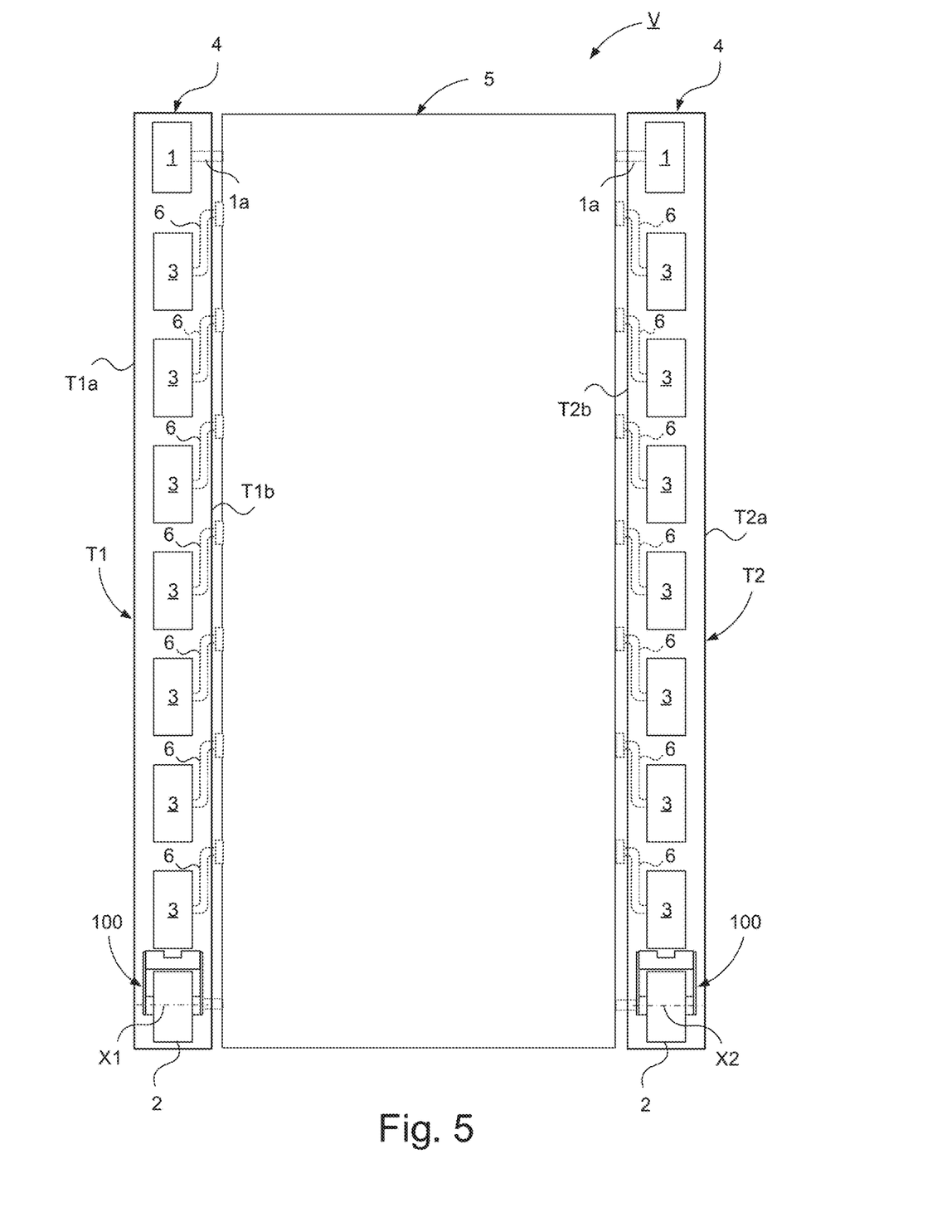
FIG. 5 schematically illustrates a plan view of the tracked vehicle in FIG. 1.

FIG. 2 thus shows a portion of the left track assembly T1. The left track assembly has an outer side T1a configured to face away from the vehicle and an inner side T1b configured to face the vehicle body, and right track assembly has an outer side T2a configured to face away from the vehicle and an inner side T2b configured to face the vehicle body, as shown in FIG. 5.

As described above with reference to FIG. 1, the deflector arrangement 100 is configured to reduce ingestion of undesired material from the ground into said track assembly and removal of such undesired material from said track assembly.

Said deflector arrangement 100 is associated with the tension wheel 2 and is resiliently suspended and biasedly arranged so as to strive towards the inner surface 4a of the endless track 4.

According to this embodiment the deflector arrangement 100 is coaxially suspended with respect to the axis X1 of the tension wheel 2. The axis X1 correspond to the axis about which the tension wheel 2 is configured to rotate.

The tension wheel 2 comprises a hub H with the axis X1. According to this embodiment the deflector arrangement 100 is coaxially suspended to the hub H of said axis X1. Thus, according to this embodiment the deflector arrangement 100 is coaxially suspended to the hub H of the tension wheel 2.

The deflector arrangement 100 is configured to be rotatably attached to the to the tension wheel 2. The deflector arrangement 100 is configured such that forces acting on the endless track 4 and transferred to the deflector arrangement 100 cause resilient oscillation of said suspension of the deflector arrangement 100.

The tension wheel 2 comprises a first wheel portion 2a and a second wheel portion 2b. The first wheel portion 2a is a left wheel portion 2a, i.e. outer wheel portion 2a, and the second wheel portion 2b is a right wheel portion 2b, i.e. an inner wheel portion 2b. Said wheel portions 2a, 2b are arranged to engage with said endless track 4 during rotation of said endless track 4. The gear portions 2a, 2b are arranged at a certain distance from each other. There is a central protrusion running along the inner side of the endless track 4. Said first wheel portion 2a is configured to be arranged on one side of the central protrusion and said second wheel portion 2b is configured to be arranged on the opposite side of the central protrusion of the endless track 4. Thus, the left wheel portion 2a is configured to run on the left side of the central protrusion and said second wheel portion 2b is configured to run on the right side of the central protrusion of the endless track 4.

As described above with reference to FIG. 1, the deflector arrangement 100 comprises a plough arrangement 110 being arranged between said tension wheel 2 and the adjacent road wheel, not shown in FIG. 2, and configured to prevent such undesired material to be carried by said endless track 110 around said tension wheel 2.

According to this embodiment of the deflector arrangement 100 said plough arrangement 110 comprises a first plough member 112 configured to be arranged in connection to the outer side T1a of the track assembly T1 and a second plough member 114 configured to be arranged in connection to the inner side T1b of the track assembly T1.

The plough arrangement 110 is adapted to the configuration of the inner side of the endless track 4 according to this embodiment. The first plough member 112 is configured to run on the outer side of the central protrusion of the endless track 4 in front of the outer wheel portion 2a of the tension wheel 2. The second plough member 114 is configured to run on the inner side of the central protrusion of the endless track 4 in front of the inner wheel portion 2b of the tension wheel 2.

The first plough member 112 and second plough member 114 are according to this embodiment of the plough arrangement 110 connected via a central plough portion 116 running over the inner central protrusion of the endless track 4. The plough arrangement 110 according to this embodiment thus comprises a central plough portion 116 arranged between the first plough member 112 and second plough member 114.

Figure 3B:
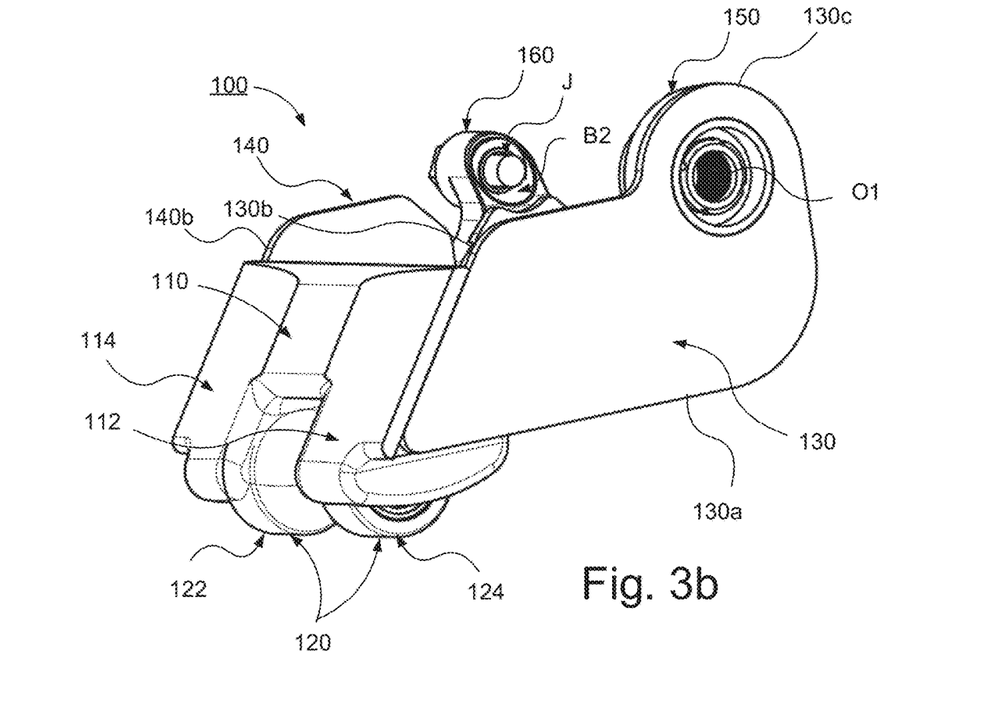
FIG. 3b schematically illustrates another perspective view of the deflector arrangement in FIG. 2.
Figure 4:
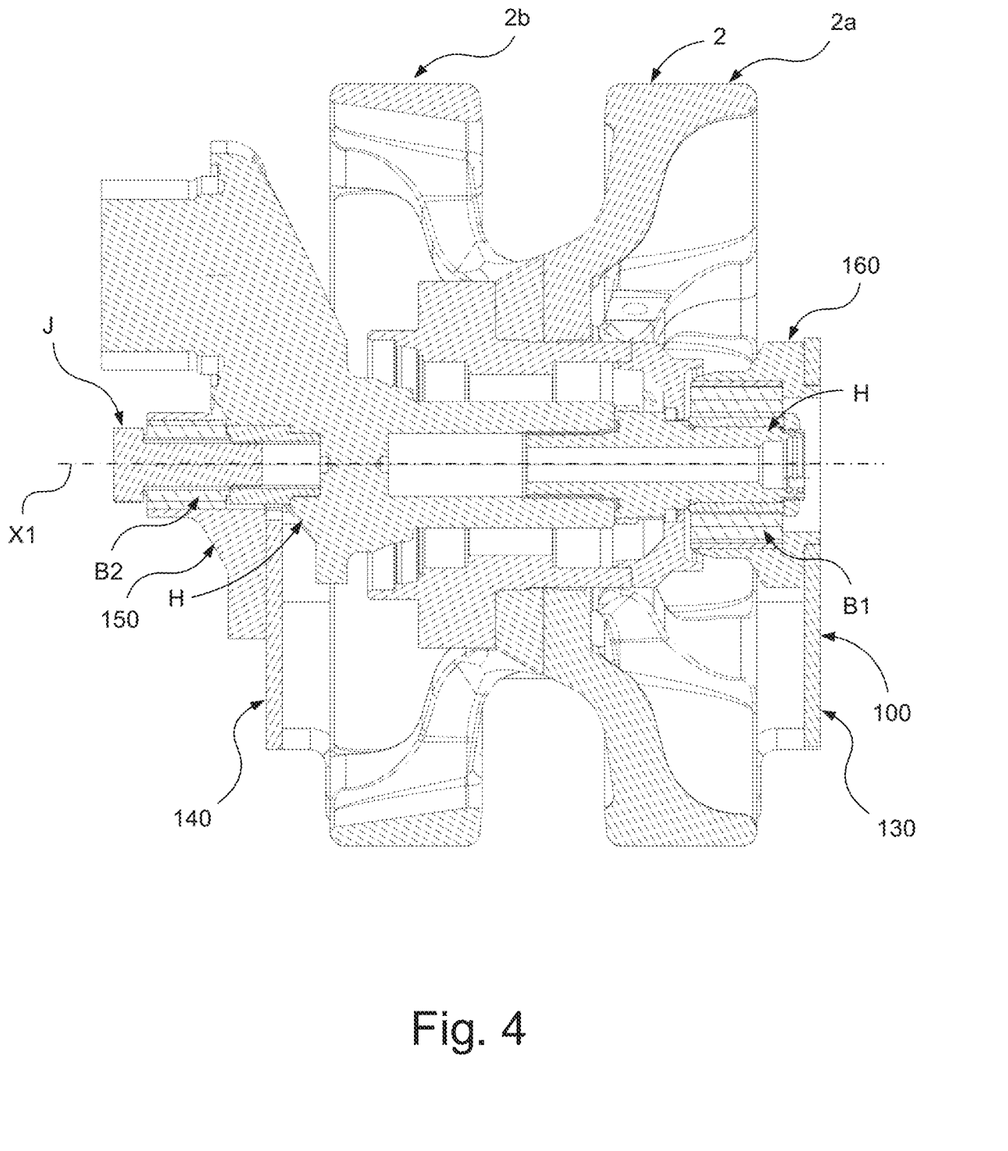
FIG. 4 schematically illustrates a cross sectional view of a tension wheel in connection to which a deflector arrangement according to the present disclosure is configured to be arranged.

As shown in FIG. 3a and FIG. 3b said deflector arrangement 100, according to this embodiment, comprises a support wheel arrangement 120 configured to roll against the inner surface 4a of said endless track 4 during movement of said vehicle.

According to this embodiment said support wheel arrangement 120 is arranged in connection to the plough arrangement 110. Said support wheel arrangement 120 is arranged in connection to the plough arrangement 110 so that the wheel members 122, 124 of the support wheel arrangement 120 are configured to roll against the inner surface 4a of said endless track 4 during movement of said vehicle.

According to this embodiment the support wheel arrangement 120 comprises a first wheel member 122 arranged in connection to the first plough member 112. A portion of the first wheel member 122 is configured to protrude from the underside, i.e. the side configured to face the inner side 4a of the track 4, of the first plough member 112. According to an embodiment the first wheel member 122 is journalled in bearings in connection to the first plough member 112.

According to this embodiment the support wheel arrangement 120 comprises a second wheel member 124 arranged in connection to the second plough member 114. A portion of the second wheel member 124 is configured to protrude from the underside, i.e. the side configured to face the inner side 4a of the track 4, of the second plough member 114. According to an embodiment the second wheel member 124 is journalled in bearings in connection to the second plough member 114.

According to this embodiment said deflector arrangement 100 comprises a first shield element 130 configured to protect the tension wheel 2 on the outer side of the tension wheel 2. The first shield element 130 is coaxially suspended to the hub H of the tension wheel 2. The first shield element 130 is coaxially suspended to the hub H of the tension wheel 2 in connection the outer side of the tension wheel 2. The first shield element 130 is laterally disposed on the outer side of the tension wheel 2.

The first shield element 130 has an extension in a plane essentially orthogonal to the transversal extension of said track assembly. The first shield element 130 has a flat configuration. The first shield element 130 has a lower portion 130a configured to face the inner side 4a of the endless track. The lower portion 130a of the first shield element is configured to run along the inner side 4a of the endless track 4.

The first shield element 130 is arranged to run forwardly along the outer side of the tension wheel 2 to a certain position passed the tension wheel 2, a front portion 130b of the first shield element 130 constituting the front end of the first shield element 130. The front portion 130b of the first shield element 130 has a rearward inclination from the lower portion 130a and upwardly.

The first shield element 130 is attached to the first plough member 112. The first plough member 112 is connected to the first shield element 130 at the front portion 130b of the first shield element 130. The first plough member 112 is attached to the hub H via the first shield element 130.

The first shield element 130 may be a separate part attached to the plough arrangement 110, i.e. the first plough member 112, or an integrated portion where the first shield element 130 and the first plough member 112 are portions of the deflector arrangement 100.

According to this embodiment said deflector arrangement 100 comprises a second shield element 140 configured to protect the tension wheel 2 on the inner side of the tension wheel 2. The second shield element 140 is coaxially suspended to the hub H of the tension wheel 2 in connection the inner side of the tension wheel 2. The second shield element 140 is laterally disposed on the inner side of the tension wheel 2.

The second shield element 140 has an extension in a plane essentially orthogonal to the transversal extension of said track assembly. The second shield element 140 has a flat configuration. The second shield element 140 has a lower portion 140a configured to face the inner side 4a of the endless track. The lower portion 140a of the second shield element is configured to run along the inner side 4a of the endless track 4.

The second shield element 140 is attached to the second plough member 114. The second plough member 114 is connected to the second shield element 140 at a front portion 140b of the second shield element 140. The second plough member 114 is attached to the hub H via the second shield element 140.

The second shield element 140 may be a separate part attached to the plough arrangement 110, i.e. the second plough member 114, or an integrated portion where the second shield element 140 and the second plough member 114 are portions of the deflector arrangement 100.

The second shield element 140 is arranged to run forwardly along the outer side of the tension wheel 2 to a certain position passed the tension wheel 2, a front portion 140b of the second shield element 140 constituting the front end of the second shield element 140. The front portion 140b of the second shield element 140 has a rearward inclination from the lower portion 140a and upwardly.

The plough arrangement 110 of the deflector arrangement is arranged in connection to the front portions 130a, 140a of the first and second shield elements 130, 140.

Thus, according to the embodiment of said deflector arrangement 100 illustrated in FIGS. 2 and 3a-b, the deflector arrangement 100 is coaxially suspended to the hub H of said axis X1, wherein each plough member 112, 114 is attached to said hub H via said laterally disposed shield elements 130, 140.

As shown e.g. in FIGS. 3a and 3b said deflector arrangement 100 comprises a first suspension member 150 arranged in connection to the first shield element 130. The first suspension member 150 may be a portion of the first shield element 130 or attached to the first shield element 130. The first suspension member 150 is arranged in connection to an upper portion 130c of the first shield element 130. The first suspension member 150 has an opening O1, see FIG. 3a-b, for receiving the hub H of the tension wheel 2 as shown in FIG. 2 and FIG. 4 described in more detail below. The opening O1 is thus coaxial relative to the axis X1.

As shown in FIG. 3a-b and FIG. 4 the first suspension member 150 comprises a first bushing B1 arranged in connection to the opening O1 of the first suspension member 150. The first bushing B1 is ring shaped.

The first suspension member 150 is configured to be coaxially suspended to the hub H of the tension wheel 2. The first bushing B1 is configured to provide a resilient suspension for the deflector arrangement 100 when the first suspension member 150 is coaxially suspended to the hub H. The first bushing B1 is configured to facilitate a biased arrangement for the deflector arrangement 100 when the first suspension member 150 is coaxially suspended to the hub H.

As shown e.g. in FIGS. 3a and 3b said deflector arrangement 100 comprises a second suspension member 160 arranged in connection to the second shield element 140. The second suspension member 160 may be a portion of the second shield element 140 or attached to the second shield element 140. The second suspension member 160 is arranged in connection to central portion 140c of the second shield element 140. The second suspension member 160 an opening for receiving a screw joint member J shown in FIG. 3a-b and FIG. 4. The screw joint member J is configured to attach the deflector arrangement 100 to the tension wheel 2 in connection to the second shield element 140.

As shown in FIG. 3a-b and FIG. 4 the second suspension member 160 comprises a second bushing B2 arranged in connection to the opening O1 of the second suspension member 160. The second bushing B2 is ring shaped.

The second suspension member 160 is configured to be coaxially suspended to the hub H of the tension wheel 2. The second bushing B2 is configured to provide a resilient suspension for the deflector arrangement 100 when the second suspension member 160 is coaxially suspended to the hub H. The second bushing B2 is configured to facilitate a biased arrangement for the deflector arrangement 100 when the second suspension member 160 is coaxially suspended to the hub H.

The bushings B1, B2 are thus comprised in or comprise or constitute a spring arrangement for providing the resilient suspension of the deflector arrangement. The bushings B1, B2 are thus comprised in or comprise or constitute a biasing arrangement for providing the biasing arrangement of the deflector arrangement so that it strives towards the inner surface of the endless track. The biasing arrangement may be comprised in the spring arrangement. Thus, according to an embodiment of the present invention the deflector arrangement 100 comprises a spring arrangement B1, B2.

The resilient suspension of the deflector arrangement according to the present invention and the biased arrangement so that the deflector arrangement strives towards the inner surface of the endless track may be obtained by any suitable spring arrangement. According to an embodiment the spring arrangement comprises a torsion spring arrangement. Such a torsion spring arrangement is according to an embodiment configured to be arranged in connection to the hub of the tension wheel. Such a torsion spring arrangement is configured to provide the resilient suspension of the deflector arrangement and the biased arrangement so that the deflector arrangement strives towards the inner surface of the endless track.

FIG. 5 schematically illustrates a plan view of the tracked vehicle V in FIG. 1.

Here the right track assembly T2 and the left track assembly T1 of the tracked vehicle V are shown.

The drive wheels 1 are operably connected to a drive axle 1a.

As mentioned above the tracked vehicle V comprises a suspension system comprising a suspension device for the respective track assembly T1, T2. The respective track assembly T1, T2 of the vehicle V is thus arranged to be supported by the vehicle body 5 by means of said suspension device.

The respective suspension device of the suspension system of the vehicle comprises according to this embodiment suspension arms 6 which may be denoted rocker arms or pendulum arms. The suspension arms 6 are in one end configured to be rotatably attached to the vehicle body 5 and in the opposite end configured to be rotatably attached to a respective road wheel 3.

Said suspension arms 6 are configured such that forces acting on said plurality of road wheels 3 cause resilient oscillation of said suspension arms 6.

The road wheels 3 of the respective track assembly of the vehicle V are thus arranged to be supported by the vehicle body 5 by means of said suspension arms 6 of the respective suspension device.

Said track assemblies T1, T2 are thus suspendedly arranged to said vehicle body 5 via said road wheels 3 by means of the suspension system.

The vehicle V described with reference to FIGS. 1 and 5 is a tracked vehicle with a left and right track assembly T1, T2 and a vehicle body to which the track assemblies are suspended attached. Each track assembly T1, T2 has a front end wheel in the form of a drive wheel 1 and a rear end wheel in the form of a tension wheel 2 and a plurality of road wheels 3 there between. Each track assembly T1, T2 comprises an endless track disposed around the wheels 1, 2, 3.

A deflector arrangement 100 is coaxially and resiliently suspended with respect to the axis X1, X2 of the tension wheel 2 of the respective track assembly T1, T2 and biasedly arranged so as to strive towards the inner surface of the endless track 4a. The plough arrangement 110 of the deflector arrangement 100 is arranged between said tension wheel 2 and adjacent road wheel 3 and configured to prevent such undesired material to be carried by said endless track around said tension wheel 2 during forward drive of the vehicle V.

The deflector arrangement 100 could for such a vehicle alternatively be coaxially and resiliently suspended with respect to the axis of the road wheel 3 adjacent to the tension wheel 2 of the respective track assembly T1, T2 and biasedly arranged so as to strive towards the inner surface of the endless track 4a. The plough arrangement 110 of the deflector arrangement 100 would in this case also be arranged between said tension wheel 2 and adjacent road wheel 3 and configured to prevent such undesired material to be carried by said endless track around said tension wheel 2 during forward drive of the vehicle V.

The deflector arrangement 100 could for such a vehicle also be coaxially and resiliently suspended with respect to the axis of the drive wheel 1 of the respective track assembly T1, T2 and biasedly arranged so as to strive towards the inner surface of the endless track 4a. The plough arrangement 110 of the deflector arrangement 100 would in this case be arranged between said drive wheel 1 and adjacent road wheel 3 and configured to prevent such undesired material to be carried by said endless track around said drive wheel 1 during backward drive of the vehicle V.

The deflector arrangement 100 could for such a vehicle alternatively to arranging it on the drive wheel 1 be coaxially and resiliently suspended with respect to the axis of the road wheel 3 adjacent to the drive wheel 1 of the respective track assembly T1, T2 and biasedly arranged so as to strive towards the inner surface of the endless track 4a. The plough arrangement 110 of the deflector arrangement 100 would in this case also be arranged between said drive wheel 1 and adjacent road wheel 3 and configured to prevent such undesired material to be carried by said endless track around said drive wheel 1 during forward drive of the vehicle V.

The tracked vehicle according to the present invention may be any suitable tracked vehicle with at least one track assembly comprising, where each track assembly comprises two end wheels in the form of a front wheel and a rear wheel, and further a plurality of road wheels there between, where at least one of the front wheel and rear wheel is a drive wheel and at least one of the front wheel and rear wheel is a tension wheel.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A deflector arrangement for a tracked vehicle, said tracked vehicle comprising at least one track assembly comprising two end wheels in the form of a front wheel and a rear wheel, and further a plurality of road wheels there between, at least one of the front wheel and rear wheel being a drive wheel and the other of the front wheel and rear wheel being a tension wheel, the track assembly further comprising an endless track, said endless track being disposed around said end wheels and plurality of road wheels, said deflector arrangement being configured to reduce ingestion of undesired material from the ground into said track assembly and removal of such undesired material from said track assembly, said deflector arrangement being associated with an end wheel and being resiliently suspended and biasedly arranged so as to strive towards an inner surface of the endless track, wherein said deflector arrangement comprises a support wheel arrangement configured to roll against the inner surface of said endless track during movement of said vehicle.

2. The deflector arrangement according to claim 1, wherein said deflector arrangement is coaxially suspended with respect to the axis of an end wheel or a road wheel adjacent to that end wheel.

3. The deflector arrangement according to claim 2, wherein said deflector arrangement comprises a plough arrangement being arranged between said end wheel and adjacent road wheel and configured to prevent such undesired material to be carried by said endless track around said end wheel.

4. The deflector arrangement according to claim 2, wherein said deflector arrangement comprises first and second laterally disposed shield elements configured to protect the wheel to which it is coaxially suspended on a transversal outer and inner side of the wheel respectively.

5. The deflector arrangement according to claim 3, wherein said support wheel arrangement is arranged in connection to the plough arrangement.

6. The deflector arrangement according to claim 3, wherein said plough arrangement comprises a first plough member configured to be arranged on an outer side of the track assembly and a second plough member configured to be arranged on an inner side of the track assembly.

7. The deflector arrangement according to claim 6, wherein said deflector arrangement is suspended to a hub of said wheel, coaxially with respect to said axis, wherein each plough member is attached to said hub via said laterally disposed shield elements.

8. The deflector arrangement according to claim 7, wherein the deflector arrangement is resiliently suspended and biasedly arranged by means of a spring arrangement.

9. The deflector arrangement according to claim 8, wherein the spring arrangement comprises bushings and/or a torsion spring arrangement arranged in connection to said hub of said wheel.

10. A tracked vehicle comprising at least one deflector arrangement according to claim 1.

11. The tracked vehicle according to claim 10, wherein said tracked vehicle comprises a left track assembly, a right track assembly and a vehicle body, wherein said track assemblies are suspendedly arranged to said vehicle body via said road wheels by means of a suspension system, each track assembly comprising at least one deflector arrangement.

* * * * *